(12) United States Patent
Cummins et al.

(10) Patent No.: US 10,948,248 B2
(45) Date of Patent: Mar. 16, 2021

(54) HEAT EXCHANGER ASSEMBLY AND METHOD FOR MOUNTING A HEAT EXCHANGER

(71) Applicant: DENSO Marston Ltd., Shipley (GB)

(72) Inventors: Craig Cummins, West Yorkshire (GB); James Emery, West Yorkshire (GB); Kyle Hinchliffe, West Yorkshire (GB)

(73) Assignee: DENSO Marston Ltd., Shipley (GB)

(*) Notice: Subject to any disclaimer, the term of this patent is extended or adjusted under 35 U.S.C. 154(b) by 99 days.

(21) Appl. No.: 16/292,470

(22) Filed: Mar. 5, 2019

(65) Prior Publication Data

US 2019/0277582 A1   Sep. 12, 2019

(30) Foreign Application Priority Data

Mar. 8, 2018  (GB) .................... 1803728.3

(51) Int. Cl.
  *F28F 9/013* (2006.01)
  *B60K 11/04* (2006.01)
  *F28F 9/02* (2006.01)

(52) U.S. Cl.
  CPC ............ *F28F 9/0131* (2013.01); *B60K 11/04* (2013.01); *F28F 9/0243* (2013.01); *F28F 2275/20* (2013.01)

(58) Field of Classification Search
  CPC .. F28F 9/0243; F28F 2275/14; F28F 2280/06; F28F 2280/10; F28F 2280/105; F28F 2280/02; B60K 11/04
  See application file for complete search history.

(56) References Cited

U.S. PATENT DOCUMENTS

| | | | | |
|---|---|---|---|---|
| 5,067,574 A | * | 11/1991 | Attinger ................. | B60K 11/04 123/41.57 |
| 6,571,898 B2 | * | 6/2003 | Guyomard ............. | B60K 11/04 165/69 |
| 6,615,604 B2 | * | 9/2003 | Neufang ............ | B60H 1/00514 165/140 |
| 7,036,617 B2 | * | 5/2006 | Harada .................. | B60K 11/04 180/68.4 |
| 7,246,674 B2 | * | 7/2007 | Andritter ............... | B60K 11/04 180/68.4 |
| 7,413,362 B2 | * | 8/2008 | Bandou .................... | B65H 1/04 16/254 |
| 7,861,988 B2 | * | 1/2011 | Hamida ................. | B60K 11/04 248/232 |
| 8,051,933 B2 | * | 11/2011 | Hwang ............. | B60H 1/00535 180/68.4 |
| 10,273,653 B1 | * | 4/2019 | Mori ..................... | E02F 9/0833 |
| 10,611,233 B2 | * | 4/2020 | Alegria Azkaiturrieta .................. | F16F 15/08 |
| 2004/0036277 A1 | | 2/2004 | Inaba et al. | |

(Continued)

FOREIGN PATENT DOCUMENTS

| | | |
|---|---|---|
| CN | 1483601 A | 3/2004 |
| CN | 201463645 U | 5/2010 |

(Continued)

*Primary Examiner* — Devon Russell
(74) *Attorney, Agent, or Firm* — Harness, Dickey & Pierce, P.L.C.

(57) ABSTRACT

A heat exchanger assembly includes a heat exchanger and a connection piece for attachment to a component of a vehicle to mount the heat exchanger. The heat exchanger includes an undercut. The connection piece is arranged to lie behind the undercut.

18 Claims, 19 Drawing Sheets

(56) References Cited

U.S. PATENT DOCUMENTS

| | | | | |
|---|---|---|---|---|
| 2006/0152022 | A1* | 7/2006 | Rech-Linker | F16F 7/12 |
| | | | | 293/115 |
| 2009/0188088 | A1* | 7/2009 | Kerkewitz | F01P 11/029 |
| | | | | 24/586.1 |
| 2009/0280971 | A1* | 11/2009 | Kunz | E05D 7/1072 |
| | | | | 483/3 |
| 2017/0282703 | A1* | 10/2017 | Schoneboom | B60K 11/04 |

FOREIGN PATENT DOCUMENTS

| | | | | |
|---|---|---|---|---|
| CN | 205225984 U | | 5/2016 | |
| DE | 29609262 U1 | | 8/1996 | |
| EP | 0331540 A1 | | 9/1989 | |
| EP | 2465720 A1 | * | 6/2012 | ........... B62D 25/084 |
| GB | 190913881 A | * | 6/1910 | ........... E05D 7/1072 |
| WO | WO-2010/023050 A2 | | 3/2010 | |

* cited by examiner

US 10,948,248 B2

HEAT EXCHANGER ASSEMBLY AND METHOD FOR MOUNTING A HEAT EXCHANGER

CROSS REFERENCE TO RELATED APPLICATION

This application is based on United Kingdom Patent Application No. GB1803728.3 filed on Mar. 8, 2018, the disclosure of which is incorporated herein by reference.

TECHNICAL FIELD

The present disclosure relates to a heat exchanger assembly. The present disclosure also relates to a method of mounting a heat exchanger.

BACKGROUND

Heat exchangers are mounted in vehicles by using various fixtures.

SUMMARY

According to an aspect of the present disclosure, a heat exchanger assembly includes a heat exchanger and a tank. The heat exchanger has a structure to be affixed to a vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

Hereinafter, examples of the present disclosure will be described.

According to an example, heat exchangers are used in vehicles, including off highway vehicles. Space constraints may arise under the bonnet of such vehicles. Therefore, there could be a desire to ensure that the heat exchanger assembly has a compact arrangement. There could be also a desire to reduce the number of components in a heat exchanger assembly, thereby simplifying installation and reducing the cost of heat exchangers.

Figure 1:
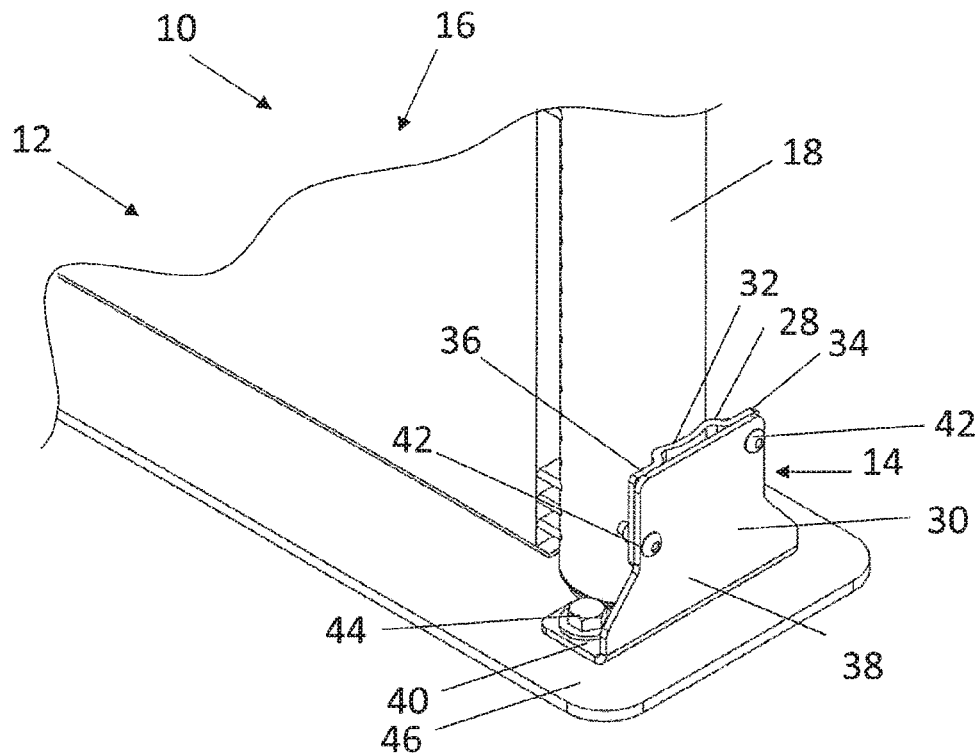
FIG. 1 is a partial perspective view of a heat exchanger mounted to a component of a vehicle using a known mounting assembly.

In an assumable example, heat exchanger assemblies including one or more heat exchangers may be mounted to a vehicle via an aluminium bracket that is brazed to the manifold tank of the heat exchanger. The aluminium bracket may first be located and tack welded in place prior to braze, which requires a location fixture. A steel mounting bracket may be then attached to the aluminium bracket with fasteners, for example rivets, before being assembled to a vehicle chassis base plate or tray, as shown in FIG. 1.

According to a first aspect of the present disclosure there is provided a heat exchanger assembly including a heat exchanger, a tank and a connection piece for attachment to a component of a vehicle to mount the heat exchanger. The heat exchanger includes an undercut provided in at least one of the end caps of the tank, the end caps having a port at one end and a portion for engagement with the opening of the tank at the opposite end and the connection piece is arranged to lie behind the undercut.

The heat exchanger assembly provides a simplified and more compact design as the connection piece is fixed to the heat exchanger by engagement with the undercut, so there is no need for the brazing and riveting of a mounting bracket to the heat exchanger.

The assembly may include a single connection piece. In this way, the number of components in the heat exchanger assembly is reduced as the single connection piece is connected to the heat exchanger and a component of the vehicle, i.e. there is no need for separate mounting brackets to be provided for each of the heat exchanger and the vehicle component, further fastenings then being required to join the two mounting brackets.

The connection piece may be a plate. This allows the heat exchanger assembly to be mounted in a smaller space within the vehicle.

The connection piece may include an open slot that defines an edge region that is to be received behind and to engage with the undercut. In this way, the need to attach the connection piece to the heat exchanger using tack welding and brazing is removed.

The open slot may be generally arcuate. Additionally or alternatively, the open slot may include a straight portion. The open slot may also be asymmetrical. The shape of the slot is designed to facilitate the installation of the heat exchanger assembly on a vehicle, for example by restricting movement of the heat exchanger relative to a component of the vehicle once the connection piece is connected to the heat exchanger and fixed in place on the vehicle component.

The connection piece may be arranged to be fastened to a component of a vehicle. The connection piece may, for example, define at least one hole to receive a fastener. The connection piece may define a hole on each side of the open slot to receive a fastener. The connection piece therefore provides a direct connection between the component of a vehicle and the heat exchanger.

The undercut may be provided in the header of the heat exchanger, and the heat exchanger may include a header having a tubular manifold with an end cap at each end. The undercut may include a circumferential groove that extends around the end cap. The provision of the undercut on the end cap enables the number of components of the heat exchanger assembly to be reduced as compared to known systems which an additional bracket to be brazed to the heat exchanger is provided.

In some embodiments, the circumferential groove may include at least one straight portion. The shape of the circumferential groove is designed to facilitate the installation of the heat exchanger assembly on a vehicle, for example by restricting movement of the heat exchanger relative to a component of the vehicle once the connection piece is connected to the heat exchanger and fixed in place on the vehicle component.

The connection piece may include a flange that is arranged for connection to a second heat exchanger. In this way, a more compact arrangement can be provided even for heat exchanger assemblies that have more than one heat exchanger.

According to a second aspect of the present disclosure there is provided a vehicle including a heat exchanger assembly according to the first aspect of the present disclosure.

According to a further aspect of the present disclosure there is provided a method of mounting a heat exchanger on a vehicle, the heat exchanger including a tank, the tank having end caps, the end caps having a port at one end and a portion for engagement with the opening of the tank at the opposite end; wherein the method includes: providing an undercut in at least one of the end caps of the tank; arranging a connection piece behind the undercut; and attaching the connection piece to a component of a vehicle.

The method may further include the step of rotating the connection piece to prevent translational movement of the heat exchanger relative to the connection piece.

According to a yet further aspect of the present disclosure there is provided a kit of parts for mounting a heat exchanger on a vehicle, the heat exchanger including a tank, the kit of parts including a heat exchanger and a connection piece for attachment to a component of a vehicle; wherein the heat exchanger includes an undercut provided in at least one of the end caps of the tank, the end caps having a port at one end and a portion for engagement with the opening of the tank at the opposite end and the connection piece is arranged to lie behind the undercut.

Hereinafter, embodiments of the present disclosure will be described with reference to drawings.

Figure 2:
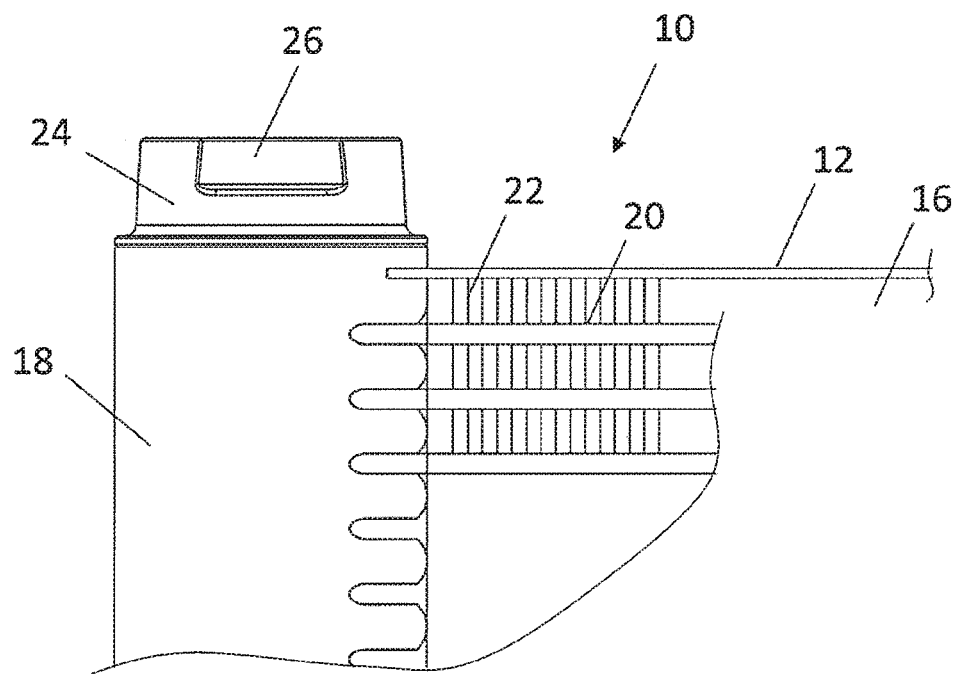
FIG. 2 is a partial front view of the heat exchanger assembly of FIG. 1.

Referring now to FIGS. 1 and 2, there is shown a heat exchanger assembly 10. The heat exchanger assembly 10 includes a heat exchanger 12 and a known heat exchanger mounting assembly 14. The heat exchanger 12 is a brazed aluminium heat exchanger.

The heat exchanger 12 includes a core 16 with a header or manifold tank 18 at each end. The core 16 may include tubes 20 and fins 22. Each header or manifold tank 18 includes an opening (not shown) in the form of an inlet or outlet at at least one of its ends.

With particular reference to FIG. 2, the opening (not shown) at one end of the header or manifold tank 18 is covered by an end cap 24 having a port 26.

Each of the openings (not shown) of the header or manifold tanks 18 of the heat exchanger 12 is covered by an end cap 24.

The heat exchanger mounting assembly 14 has a first mounting bracket 28 and a second mounting bracket 30.

The first mounting bracket 28 has a plate portion 32 and two flange portions 34, 36 that extend out of the plane of the plate portion 32 and lie in a plane that is parallel to the plane of the plate portion 32.

The second mounting bracket 30 is made from steel and has a plate portion 38, a base portion 40, a first pair of fasteners 42 and a second pair of fasteners 44, only one of which is shown in FIG. 1. The base portion 40 extends from the plate portion 38 such that the plane of the base portion 40 is generally perpendicular to the plane of the plate portion 38.

The heat exchanger 12 is mounted on a component of a vehicle, in this example a base tray or plate 46 of a vehicle (not shown), by locating the plate portion 32 of the first mounting bracket 28 on the outer wall of the header or manifold tank 18 and tack welding it in position prior to brazing.

The steel second mounting bracket 30 is attached to the first mounting bracket 28 using the first pair of fasteners 42 in the form of rivets that extend through the plate portion 38 of the second mounting bracket 30 and the flange portions 34, 36 of the first mounting bracket 28.

The base portion 40 of the second mounting bracket 30 can then be attached to a surface of the base tray or plate 46 using the second pair of fasteners 44 in the form of bolts that extend through the base portion 40 of the second mounting bracket 30 and the base tray or plate 46 of the vehicle (not shown).

A second heat exchanger mounting assembly (not shown) is included at the opposite end of the heat exchanger assembly 10.

It can thus be seen that known heat exchanger mounting assemblies include more than one mounting bracket that are attached to the heat exchanger and vehicle using a combination of tack welding, brazing and fasteners, including rivets and bolts.

With reference to FIGS. 3 to 7B, there is shown a heat exchanger assembly 110 according to a first embodiment of the present disclosure. The heat exchanger assembly 110 includes a heat exchanger 112 and a heat exchanger mounting assembly 114.

The heat exchanger 112 includes a core 116 with a header or manifold tank 118 at each end. The core 116 may include tubes 120 and fins 122. Each header or manifold tank 118 includes an opening (not shown) in the form of an inlet or outlet at one or both of its ends. Each of the openings (not shown) is covered by an end cap 124.

Figure 5:
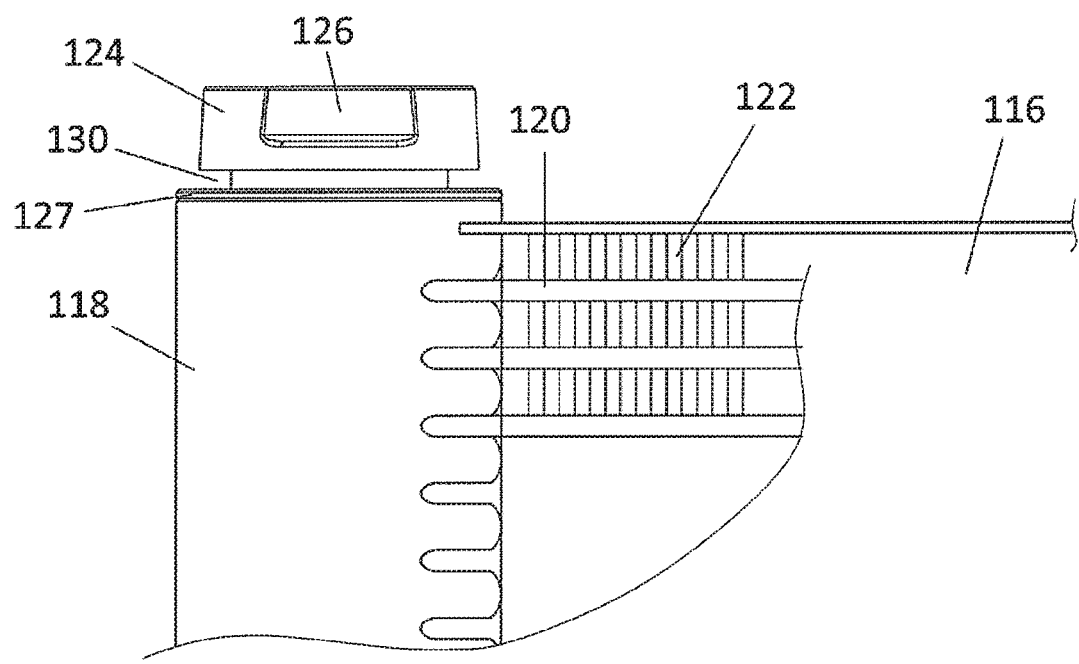
FIG. 5 is a partial front view of the heat exchanger assembly of FIG. 3.
Figure 6:
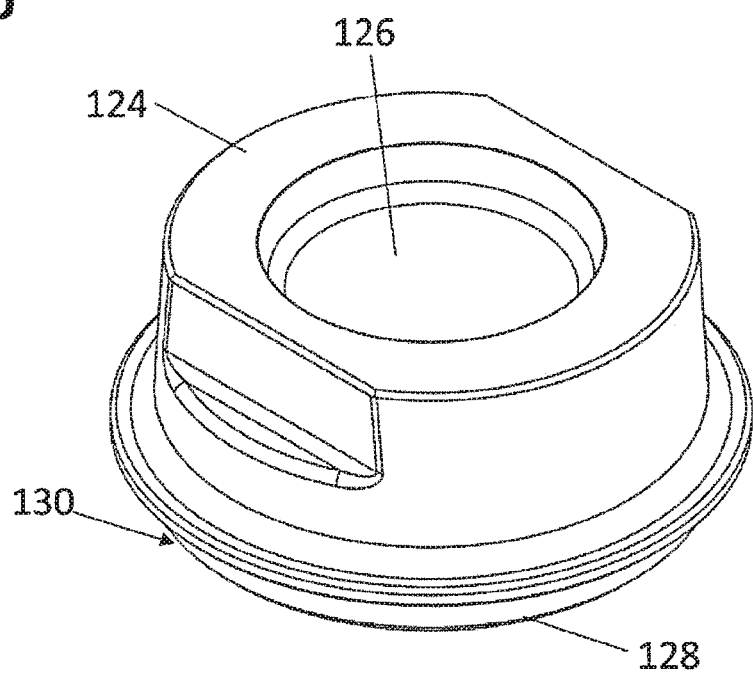
FIG. 6 is a perspective view of an end cap for use in conjunction with the heat exchanger assembly of FIG. 3.

With particular reference to FIGS. 5 and 6, the end caps 124 are generally cylindrical and have a port 126 at one end and a portion 128 at an opposite end, the portion 128 being configured for engagement with the opening (not shown) of the header or manifold tank 118. The end cap further includes an outwardly extending circumferential flange 127 adjacent the portion 128 to contact the end of the cylindrical tubular manifold tank 118. The end cap 124 includes an undercut or recess 130 in the form of a circumferential groove between the port 126 and the portion 128, adjacent the flange 127 and outwardly thereof.

Figure 4:
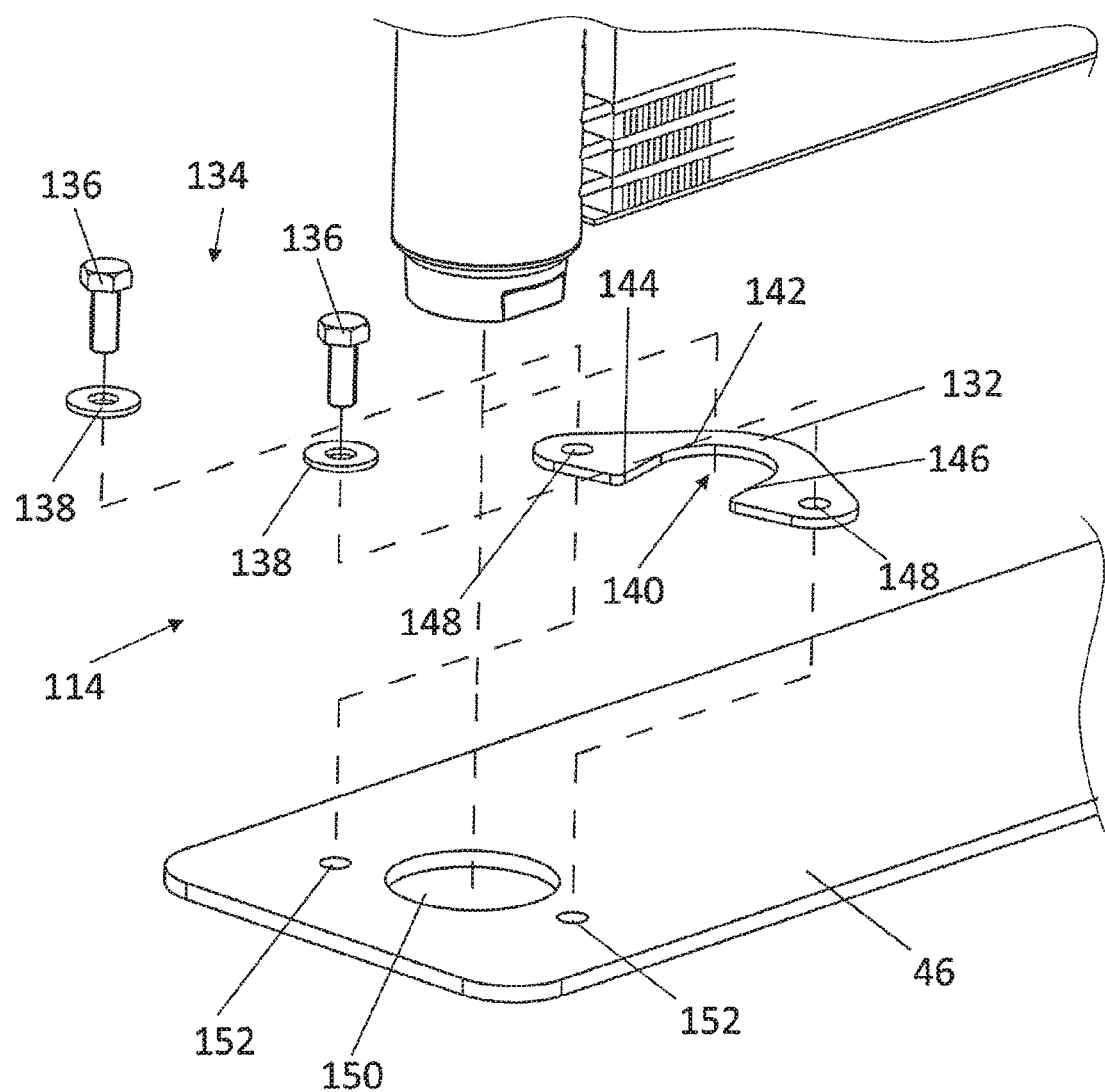
FIG. 4 is a partial exploded view of the heat exchanger assembly of FIG. 3.
Figure 7A:
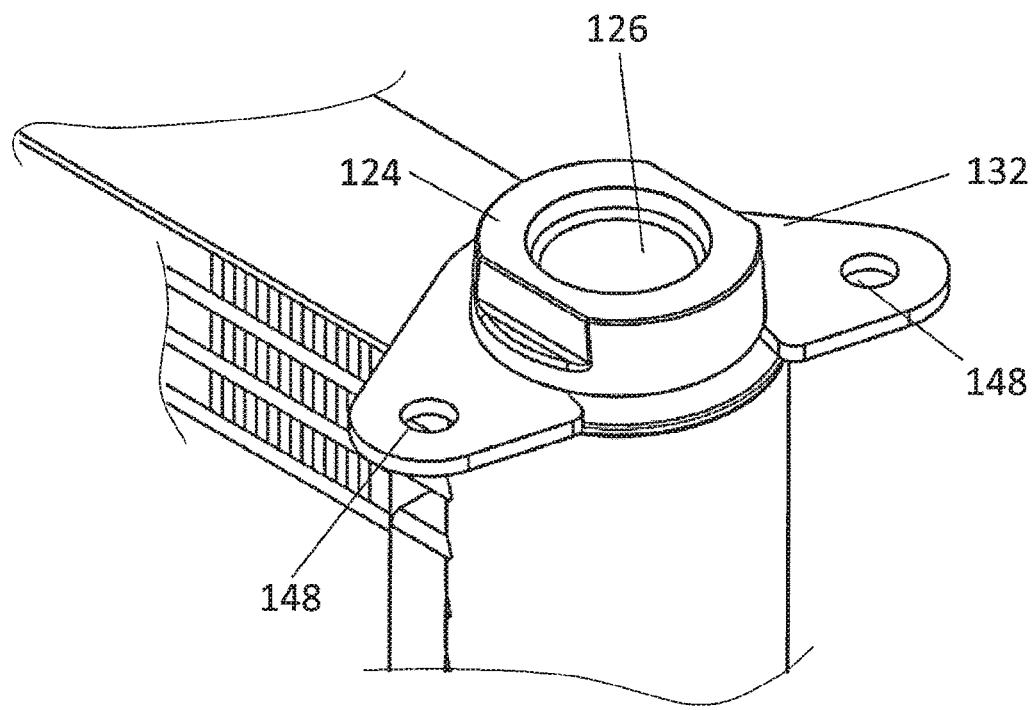
FIG. 7A is an alternative partial perspective view of the heat exchanger assembly of the first embodiment of the present disclosure.
Figure 7B:
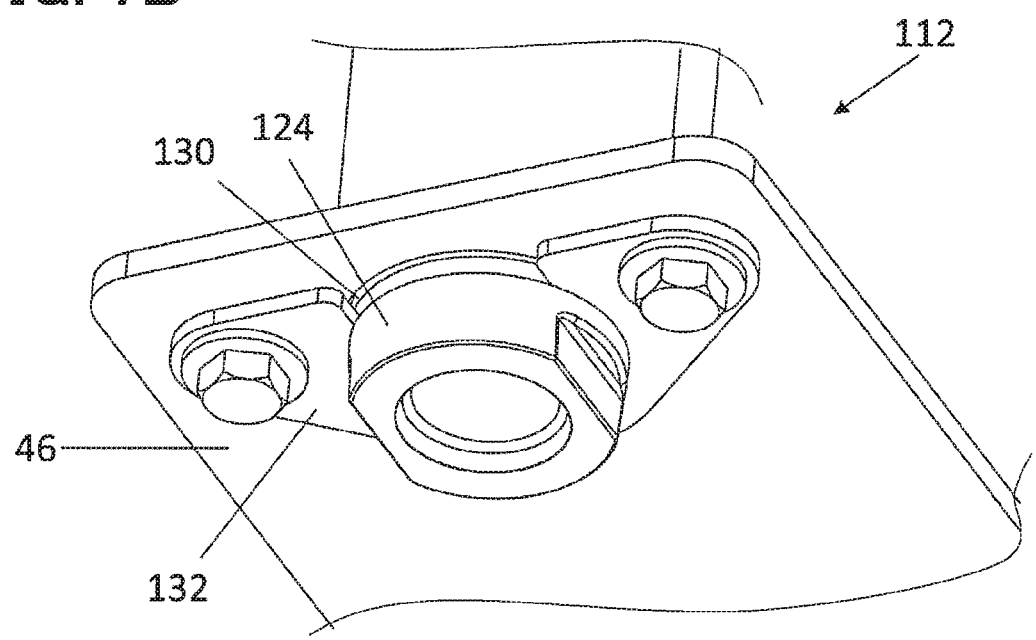
FIG. 7B is a further alternative partial perspective view of the heat exchanger assembly of the first embodiment of the present disclosure.

Referring now to FIGS. 4, 7A, and 7B, the mounting assembly 114 includes a connection piece or plate 132, which may also be considered to be a planar mounting bracket, and a pair of fasteners 134 in the form of bolts 136 with washers 138.

The connection piece or plate 132 is arranged to lie behind the undercut 130 of the end cap 124. In particular, the connection piece or plate 132 includes a generally C-shaped open slot 140 that has an inner edge 142. The inner edge 142 is generally arcuate with straight portions 144, 146 adjacent to the opening.

The connection piece or plate 132 is arranged to be attached to a component of a vehicle, in this case base tray or plate 46. In more detail, the connection piece or plate 132 includes two holes or apertures 148.

The base tray or plate 46 includes a first hole or aperture 150 that is arranged to receive the end cap 124 of the heat exchanger 112 and two smaller holes or apertures 152 that are arranged to receive the bolts 136.

To mount the heat exchanger 112 on the base tray or plate 46, the connection piece or plate 132 is aligned with the end cap 124 such that the open slot 140 is aligned with the undercut 130 and the inner edge 142 of the open slot 140 abuts an outer wall of the end cap 124 in the region of the undercut 130.

The heat exchanger 112 is aligned with the component of the vehicle to which it is to be mounted, in this example the base tray or plate 46, such that the end cap 124 extends through the hole or aperture 150 and the holes or apertures 148 of the connection piece or plate 132 are aligned with the holes or apertures 152 of the base tray 46. The fasteners 134 are passed through the holes or apertures 148, 152 and secured in position to securely attach the heat exchanger 112 to the base tray or plate 46.

It can clearly be seen that the heat exchanger assembly 110 of this embodiment of this present disclosure simplifies the installation of a heat exchanger 112 on a component of a vehicle and requires fewer components.

Although the mounting of the heat exchanger 112 on the base tray or plate 46 was described with reference to FIGS. 3 and 4, in which the base tray or plate 46 is pictured beneath the heat exchanger 112 such that the connection piece 132 is mounted on an upper surface of the base tray or plate 46, it will be understood that the connection piece 132 may be mounted to a lower surface of the base tray or plate 46 if the connection piece 132 is attached to an upper end cap 124, as shown in FIG. 7A.

It will also be understood that although the end cap 124 is shown to have a port 126, if the end of the manifold tank 118 is not required for an inlet or an outlet, a closed end cap without a port may be provided.

Figure 3:
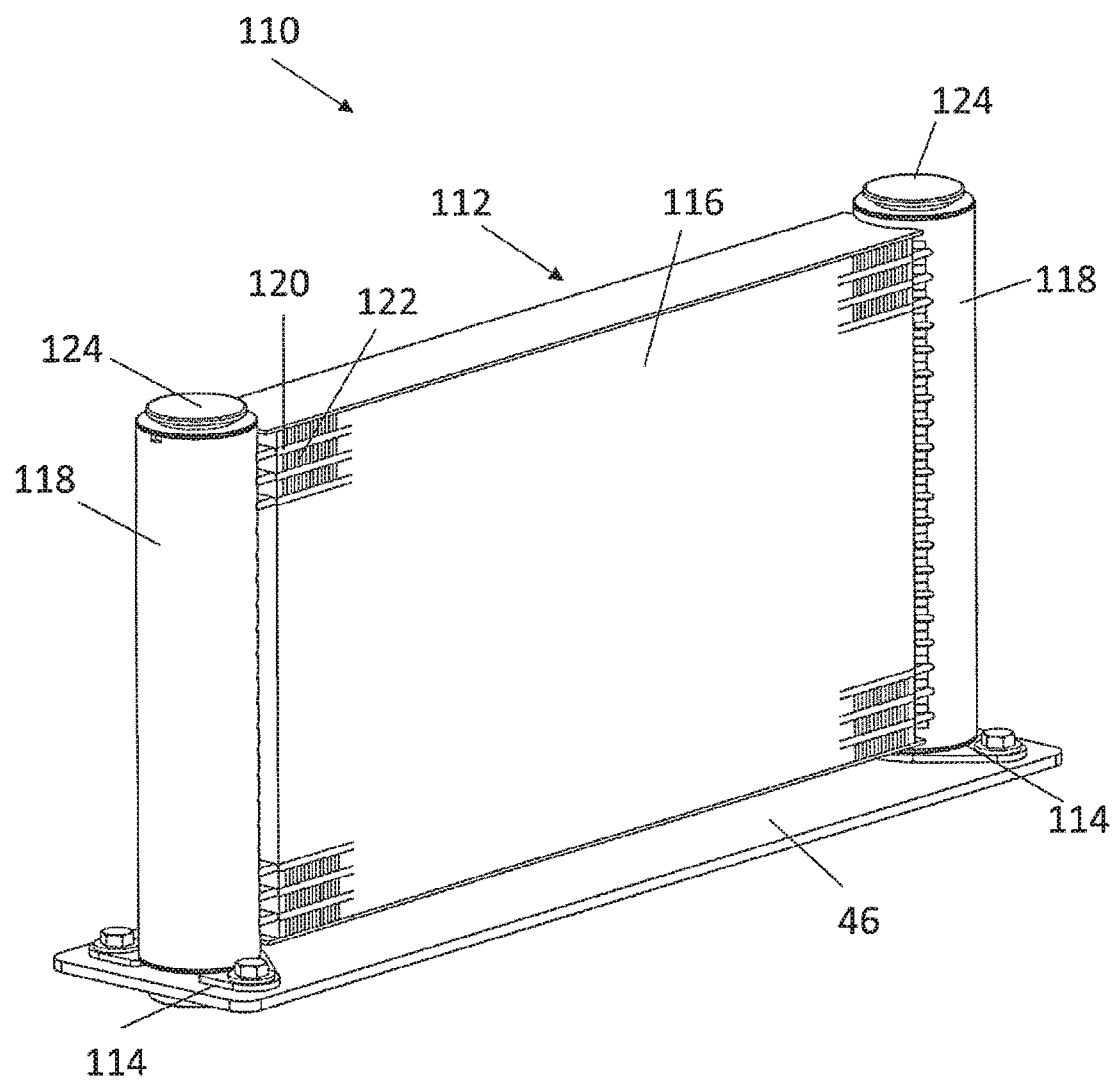
FIG. 3 is a perspective view of a heat exchanger assembly according to a first embodiment of the present disclosure.

In the embodiments of the present disclosure as shown in FIGS. 3 and 7A, the connection piece 132 is mounted on the base tray or plate 46 such that the connection piece 132 is on the same side of the base tray or plate 46 as the heat exchanger 112. It will be understood that, in alternative embodiments of the present disclosure, for example as shown in FIG. 7B, the connection piece 132 may be mounted on the base tray or plate 46 such that the connection piece is on the opposite side of the base tray or plate 46 from the heat exchanger 112. In such an embodiment, it will be understood that the groove 130 would be closer to the free end of the cap 124, so that there would be a blank area between the groove 130 and the flange 127 to receive the base tray or plate 46.

Figure 8A:
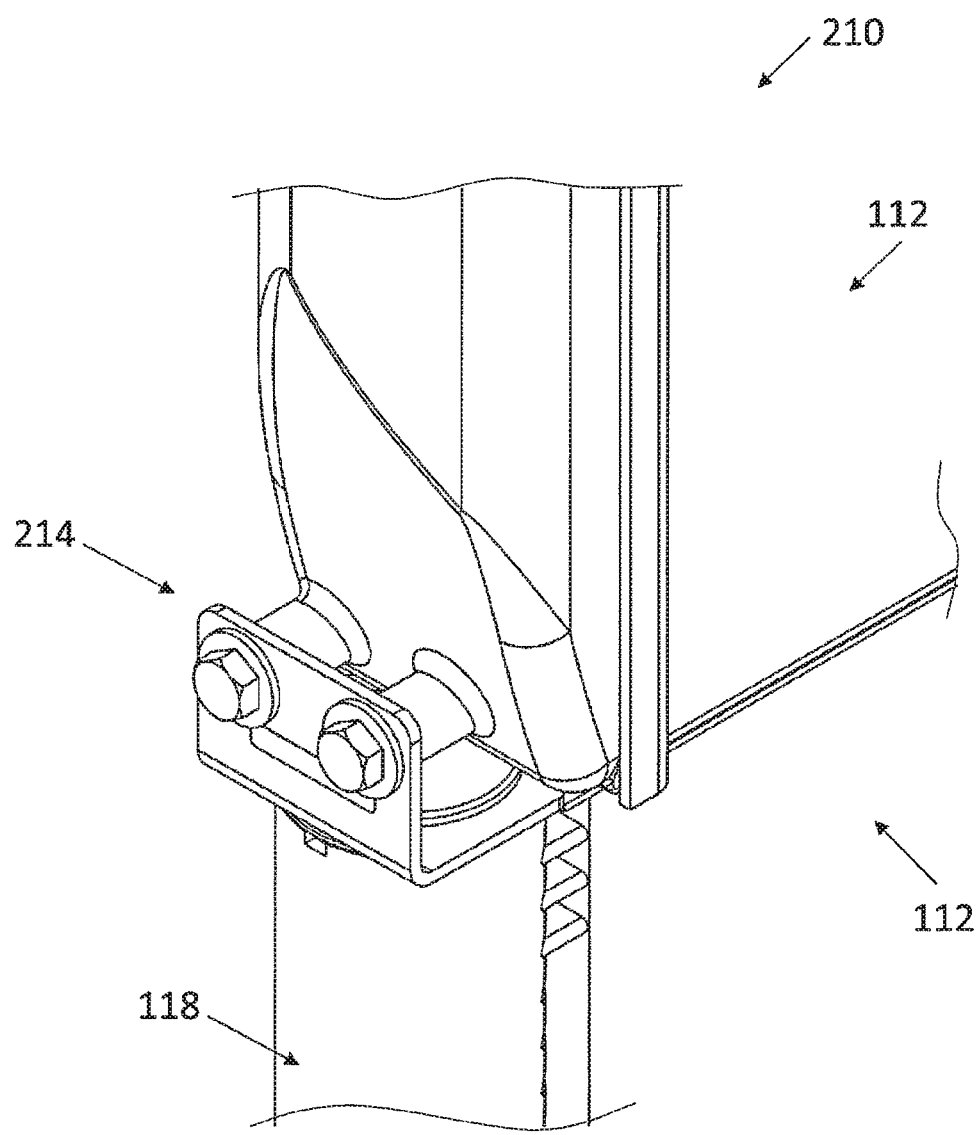
FIG. 8A is a partial perspective view of a heat exchanger assembly according to a second embodiment of the present disclosure.
Figure 8B:
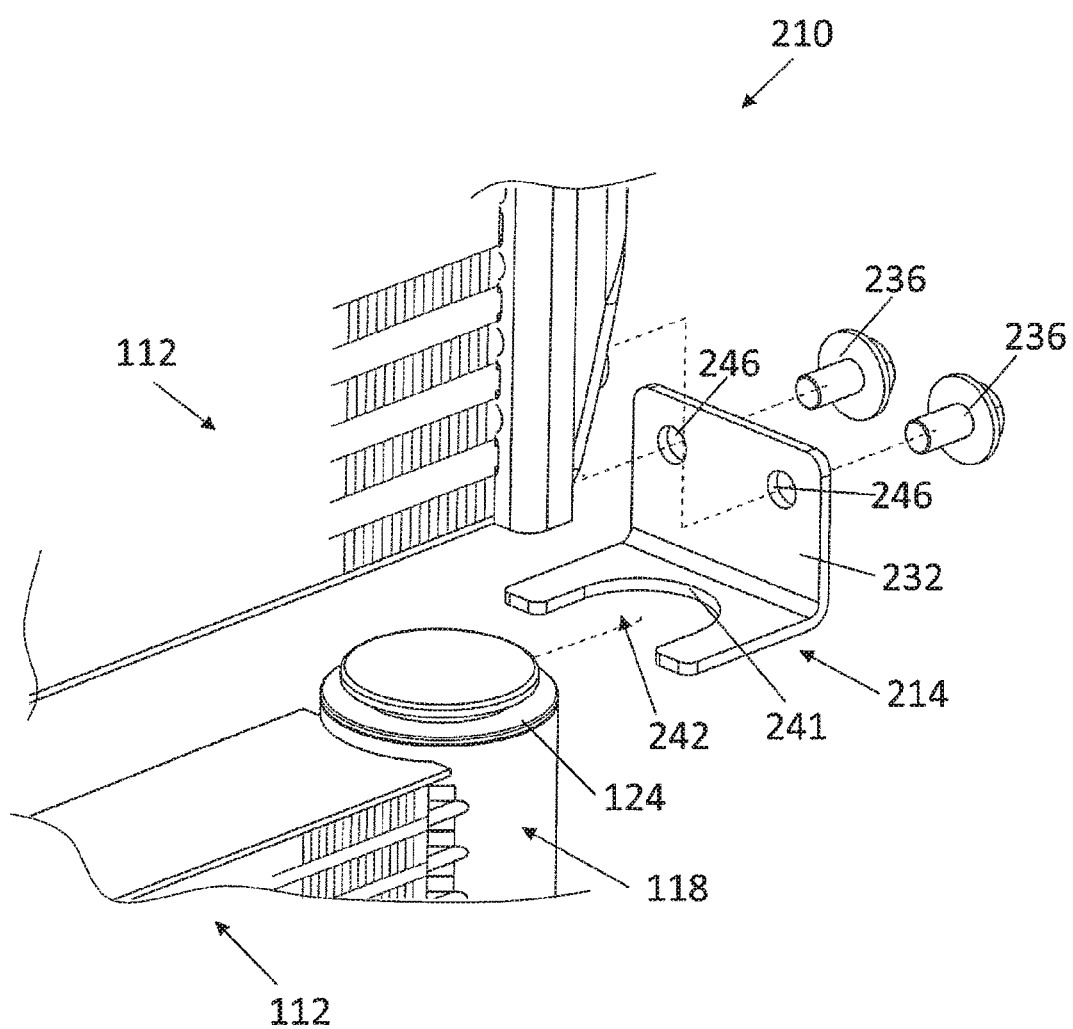
FIG. 8B is an exploded view of the heat exchanger assembly of FIG. 8.
Figure 9:
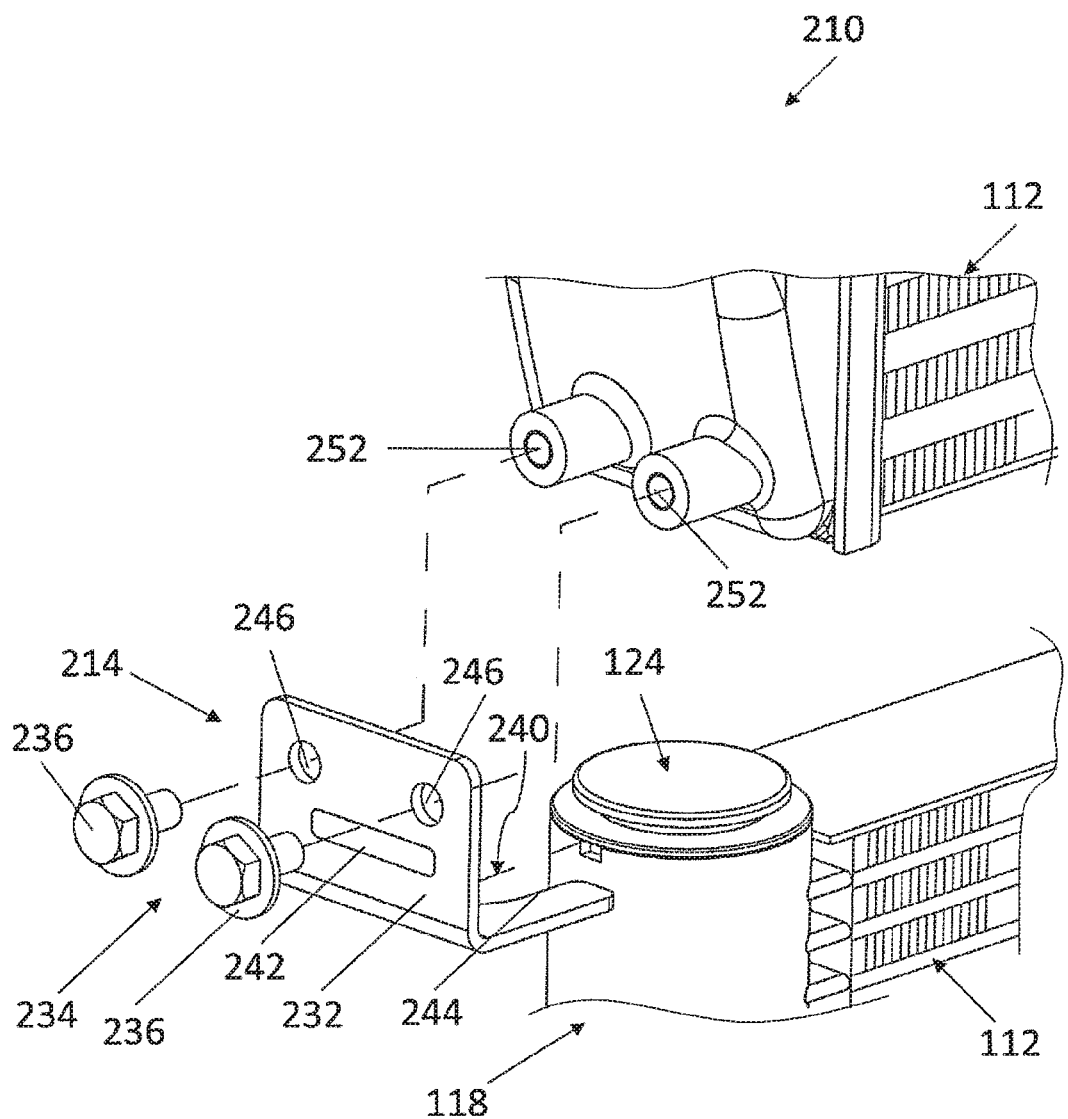
FIG. 9 is an alternative exploded view of the heat exchanger assembly of FIG. 8.
Figure 10:
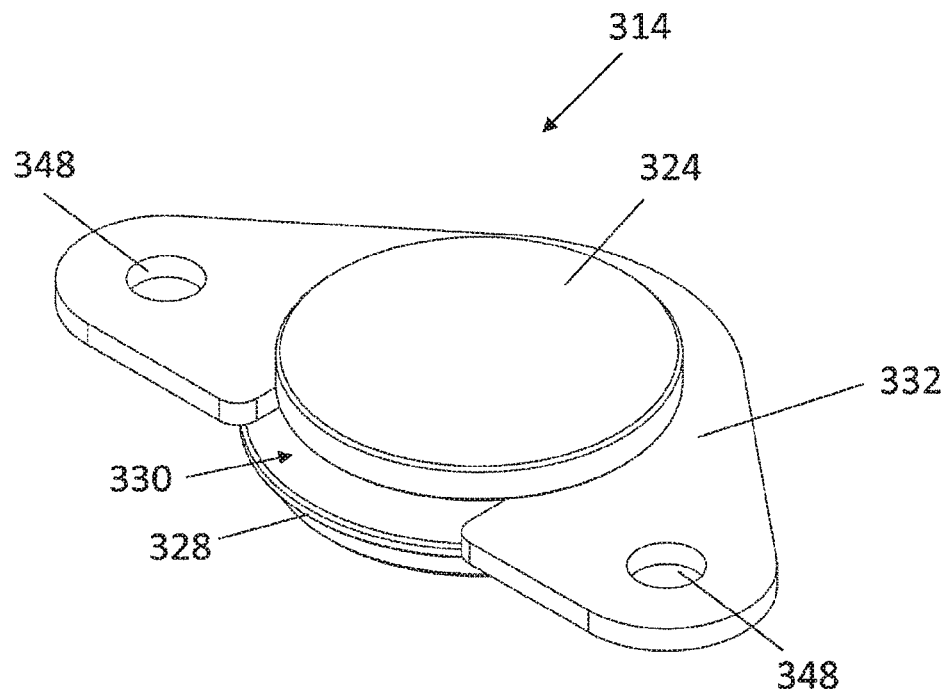
FIG. 10 is a perspective view of a heat exchanger assembly according to a third embodiment of the present disclosure.
Figure 11:
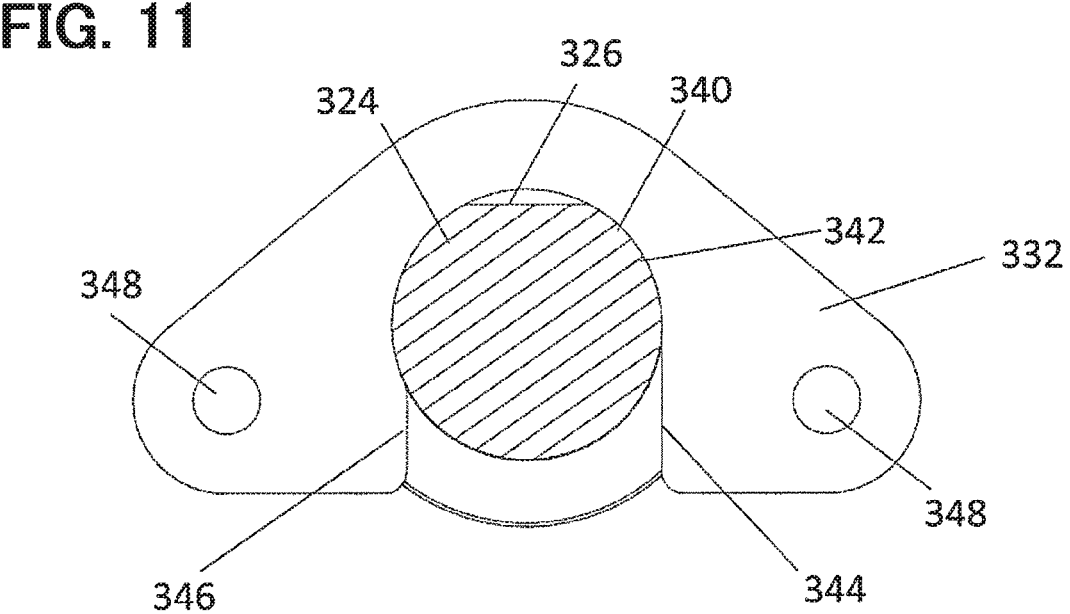
FIG. 11 is a partial cross section view of the heat exchanger assembly of FIG. 10.
Figure 12:
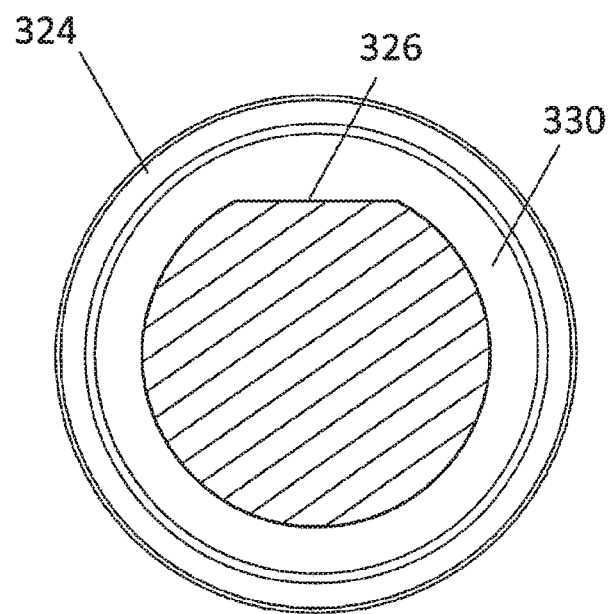
FIG. 12 is a partial cross section view of an end cap for the heat exchanger assembly of FIG. 10.
Figure 13:
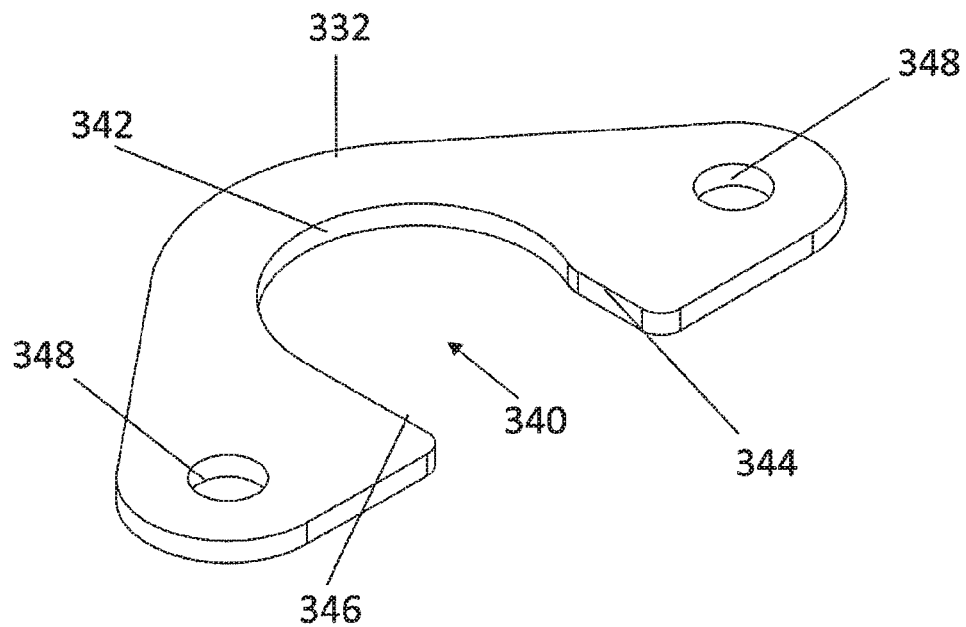
FIG. 13 is a perspective view of a connection piece for the heat exchanger assembly of FIG. 10.

Referring now to FIGS. 8A, 8B, and 9, there is shown a heat exchanger assembly 210 according to a second embodiment of the present disclosure. The heat exchanger assembly 210 includes a first heat exchanger 112a, a second heat exchanger 112b and a heat exchanger mounting assembly 214.

Each of the heat exchangers 112a, 112b is a heat exchanger as described in relation to the first embodiment of the present disclosure. Like reference numerals depict like features, which will not be described further.

As shown in FIG. 9, the mounting assembly 214 includes a connection piece or bracket 232 and a pair of fasteners 234 in the form of bolts with washers 236.

The connection piece or bracket 232 is arranged to lie behind the undercut 130 of the end cap 124. In particular, the connection piece or bracket 232 includes an open slot 240 that has an inner edge 241. The inner edge 241 is generally arcuate with straight portions 244 adjacent to the opening.

The connection piece or bracket 232 is arranged to be attached to a component of a vehicle, in this case base tray or plate 46, as well as the second heat exchanger 112b. In more detail, the connection piece or plate 232 includes an elongate slot 242 and two holes or apertures 246.

To mount the first heat exchanger 112a to the second heat exchanger 112b, the connection piece or plate 232 is aligned with the end cap 124 such that the open slot 240 is aligned with the undercut 130 and the inner edge 241 of the open slot 240 abuts an outer wall of the end cap 124 in the region of the undercut 130.

The first heat exchanger 112a is aligned with the second heat exchanger 112b such that the holes or apertures 246 of the connection piece or bracket 232 are aligned with holes or apertures 252 of the second heat exchanger 112*b*. The fasteners 234 are passed through the holes or apertures 246, 252 and secured in position to securely attach the first heat exchanger 112*a* to the second heat exchanger 112*b*.

It can clearly be seen that the heat exchanger assembly 210 of this embodiment of this present disclosure simplifies the installation of two heat exchangers 112*a*, 112*b* and requires fewer components. It will also be seen that the shape of the open slot 240 enables a degree of movement between the two heat exchangers to be accommodated. This can be useful where there is differential thermal expansion in particular between heat exchangers of different types such as an oil cooler and a charge air cooler.

Figure 32:
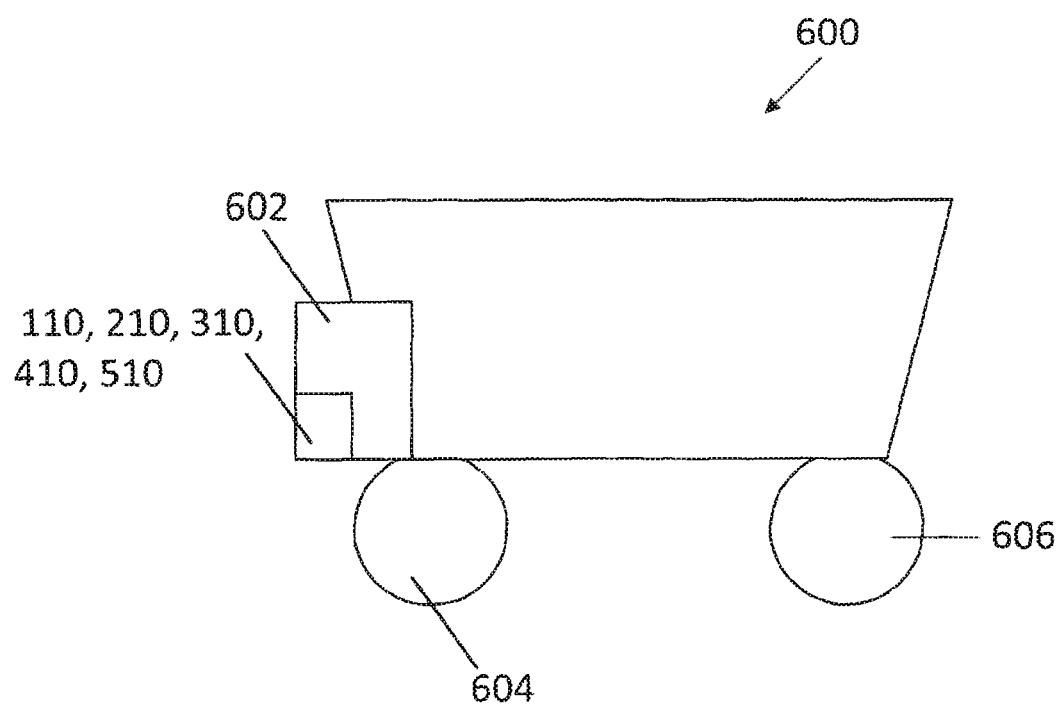
FIG. 32 is a schematic representation of a vehicle having a heat exchanger assembly according to the present disclosure.

With particular reference to FIGS. 10 to 16, there is shown a heat exchanger mounting assembly 314 for a heat exchange assembly 310 according to a third embodiment of the present disclosure (see FIG. 32). The heat exchanger assembly 310 includes a first heat exchanger 112*a* and a heat exchanger mounting assembly 314.

The heat exchanger 112 is a heat exchanger as described in relation to the first embodiment of the present disclosure. Like reference numerals depict like features, which will not be described further.

The end caps 324 of this embodiment of the present disclosure are generally cylindrical and have a portion 328 at one end. The portion 328 is configured for engagement with the opening (not shown) of the header or manifold tank 118. The end cap 324 includes an undercut or recess 330 in the form of a circumferential groove between an upper surface of the end cap 324 and the portion 328. The undercut or recess 330 includes a flat or straight or planar portion 326.

The mounting assembly 314 includes a connection piece or plate 332, which may also be considered to be a planar mounting bracket.

The connection piece or plate 332 is arranged to lie behind the undercut 330 of the end cap 324. In particular, the connection piece or plate 132 includes an open slot 340 that has an inner edge 342. The inner edge 342 is generally arcuate with straight portions 344, 346 adjacent to the opening. In this case, the straight portion 346 is stepped inwards, so that the mouth of the slot 340 is wider than the main part circular opening behind the mouth.

Figure 14:
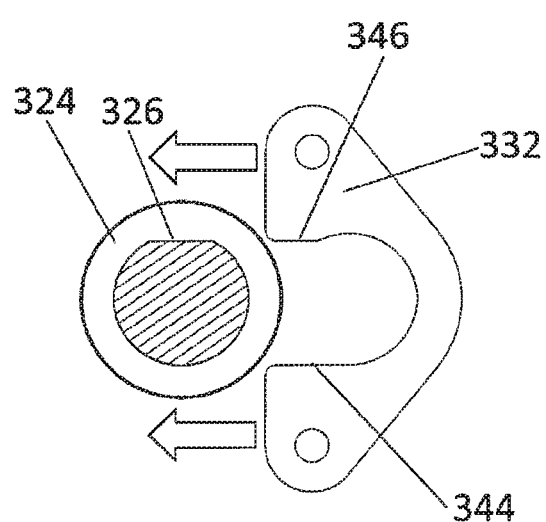
FIG. 14 is a cross section view of the heat exchanger assembly of FIG. 10 in a pre-assembled arrangement.
Figure 15:
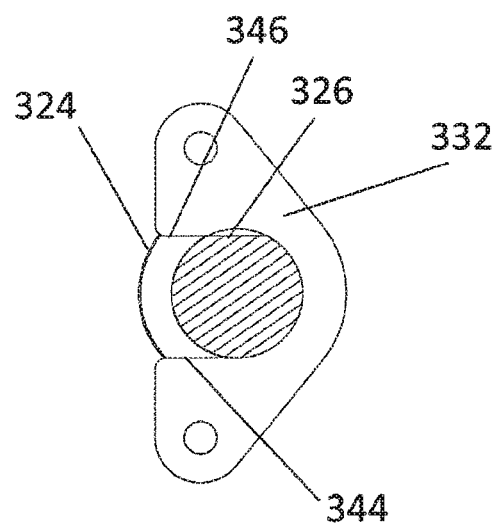
FIG. 15 is a cross section view of the heat exchanger assembly of FIG. 10 with the connection piece assembled on the end cap.
Figure 16:
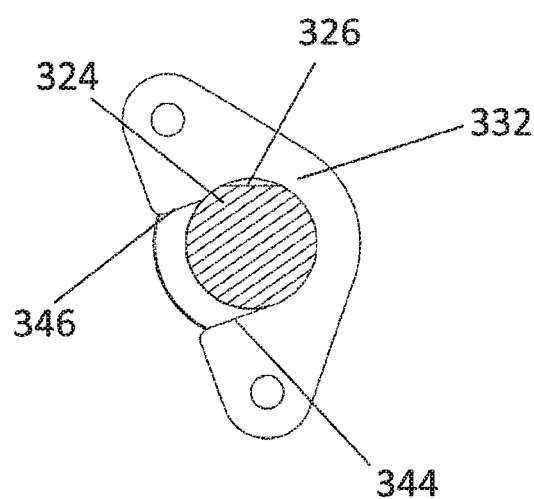
FIG. 16 is a cross section view of the heat exchanger assembly of FIG. 10 with the connection piece locked on the end cap.
Figure 17:
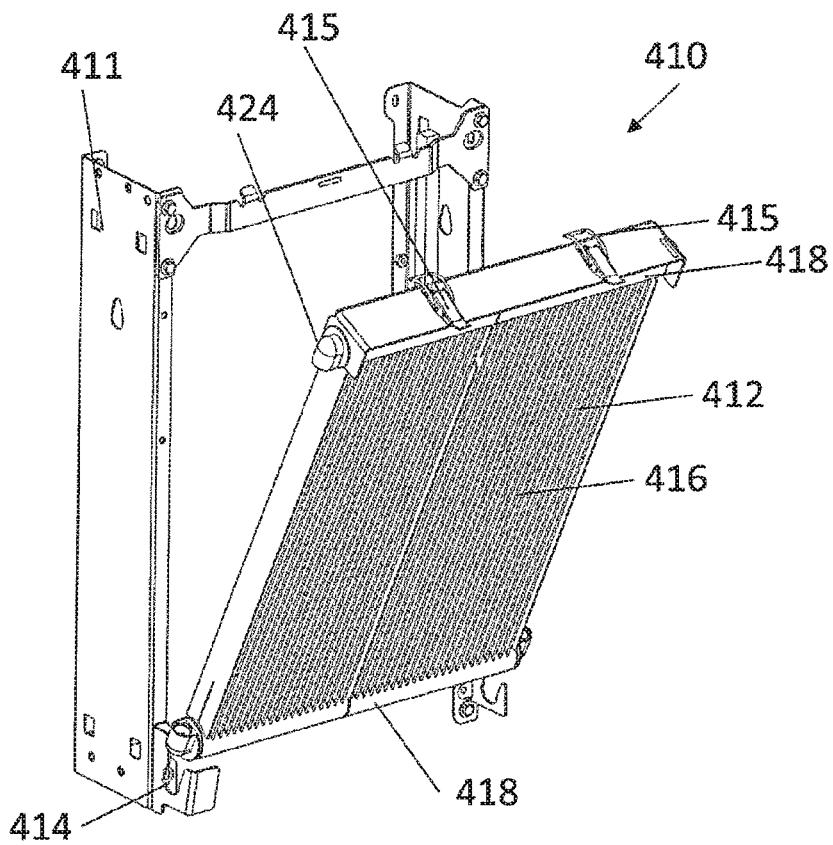
FIG. 17 is a perspective view of a heat exchanger assembly according to a fourth embodiment of the present disclosure.

With particular reference to FIGS. 14 to 16, the connection piece or plate 332 is aligned with the end cap 324 such that the open slot 340 is aligned with the undercut 330 and the inner edge 342 of the open slot 340 abuts an outer wall of the end cap 324 in the region of the undercut 330. In the configuration shown in FIG. 15, the flat portion 326 of the undercut 330 is aligned with one of the straight portions 344, 346 of the connection piece 332. In this way, the connection piece 332 can be separated from the end cap 324. FIG. 16 shows a locked configuration, in which the flat portion 326 of the undercut 330 is offset relative to each of the straight portions 344, 346 of the connection piece 332 and so the connection piece 332 cannot be separated from the end cap 324. In other words the flat portion 326 of the end cap 324 acts as a camlock feature.

The connection piece or plate 332 is arranged to be attached to a component of a vehicle, as described in relation to the first embodiment of the present disclosure. In more detail, the connection piece or plate 332 includes two holes or apertures 348 by which the connection piece or plate 332 can be fastened to a component of a vehicle.

It can clearly be seen that the heat exchanger assembly 310 of this embodiment of this present disclosure simplifies the installation of a heat exchanger 112 on a component of a vehicle and requires fewer components, while providing a simple cam lock connection to prevent disconnection of the parts.

Referring now to FIGS. 17 to 26, there is shown a heat exchanger assembly 410 according to a fourth embodiment of the present disclosure. The heat exchanger assembly 410 includes a heat exchanger 412 and a heat exchanger mounting assembly 414.

The heat exchanger 412 includes a core 416 with a header or manifold tank 418 at each of the top and bottom edge of the core 416. Each header or manifold tank 418 includes an opening (not shown) in the form of an inlet or outlet at each of its ends. Each of the openings (not shown) is covered by an end cap 424.

Figure 23:
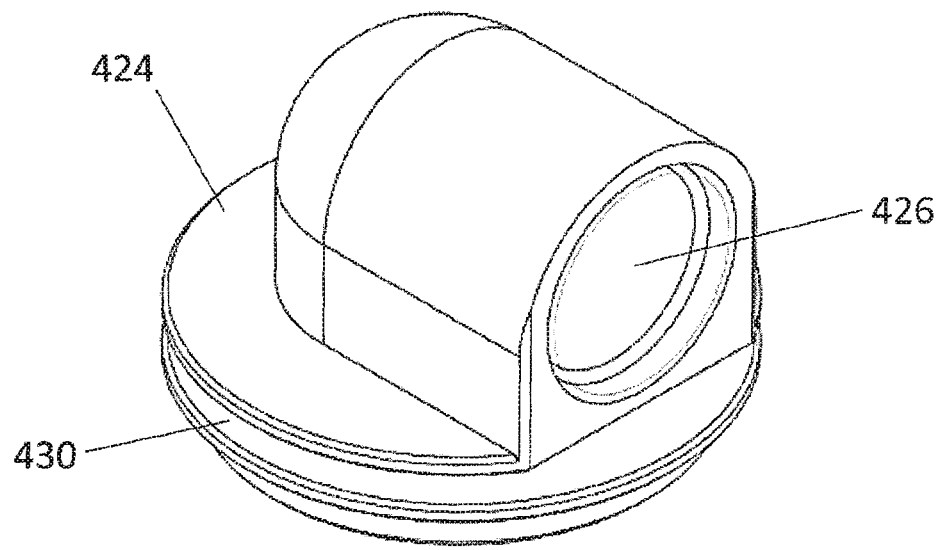
FIG. 23 is a perspective view of an end cap for the heat exchanger assembly of FIG. 17.
Figure 24:
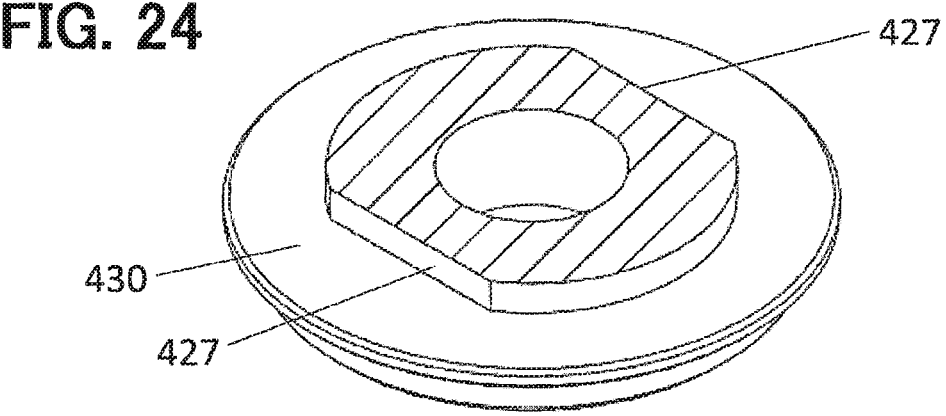
FIG. 24 is a cross section view of the end cap of FIG. 23.

With particular reference to FIGS. 23 and 24, the end caps 424 are generally cylindrical and have a port 426 at one end and a portion 428 at an opposite end, the portion 428 being configured for engagement with the opening (not shown) of the header or manifold tank 418. The end cap 424 includes an undercut or recess 430 in the form of a circumferential groove between the port 426 and the portion 428. The undercut or recess 430 includes a pair of flat or straight or planar portions 427, each of which is located on an opposite side of the undercut 430.

Figure 25:
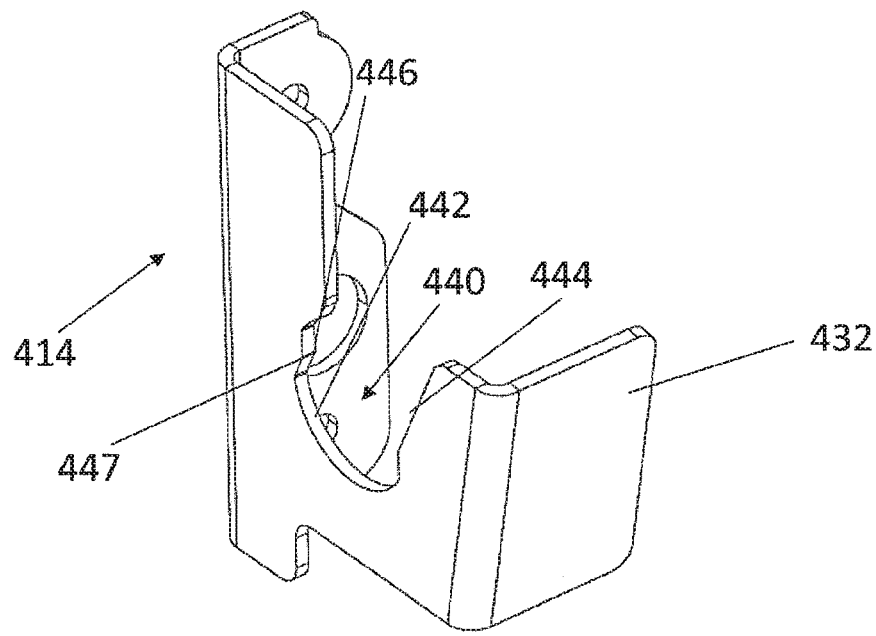
FIG. 25 is a perspective view of a connection piece for the heat exchanger assembly of FIG. 17.
Figure 26:
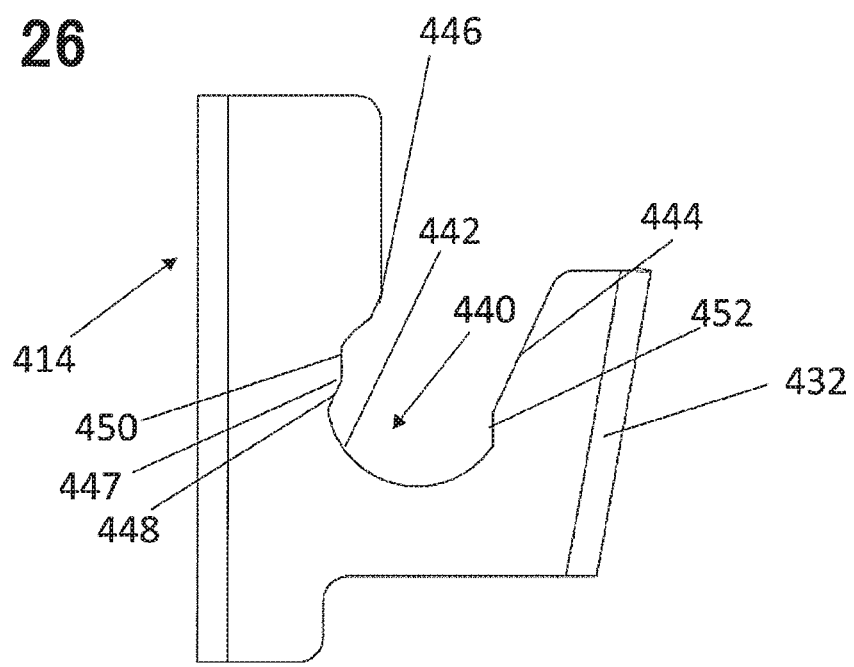
FIG. 26 is a side view of the connection piece of FIG. 25.
Figure 27:
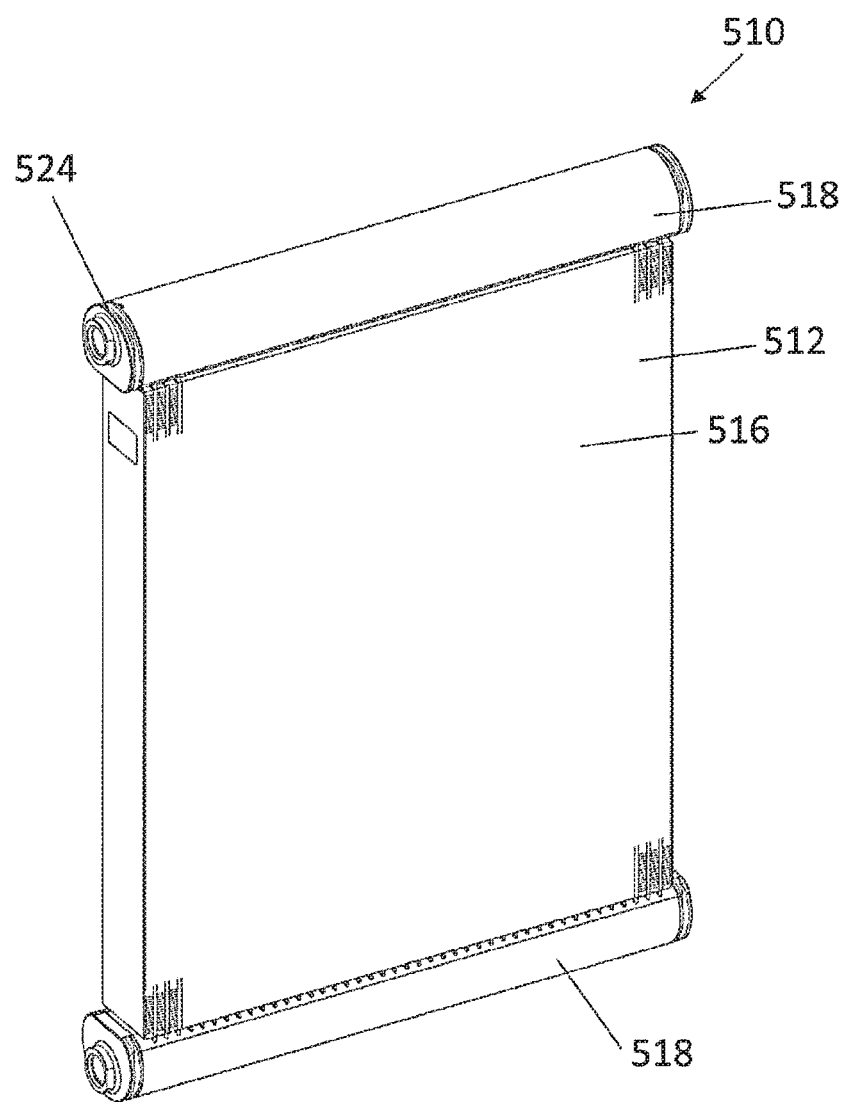
FIG. 27 is a perspective view of a heat exchanger assembly according to a fifth embodiment of the present disclosure.
Figure 28:
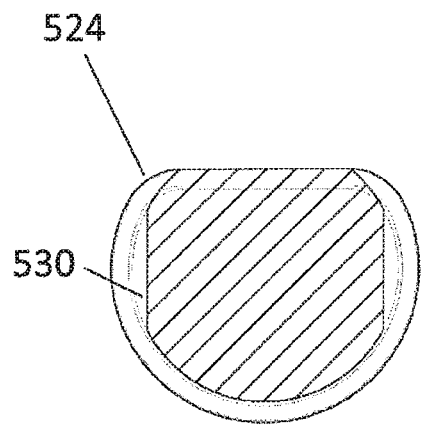
FIG. 28 is a cross section view of one of the end caps of the heat exchanger assembly of FIG. 27.
Figure 29:
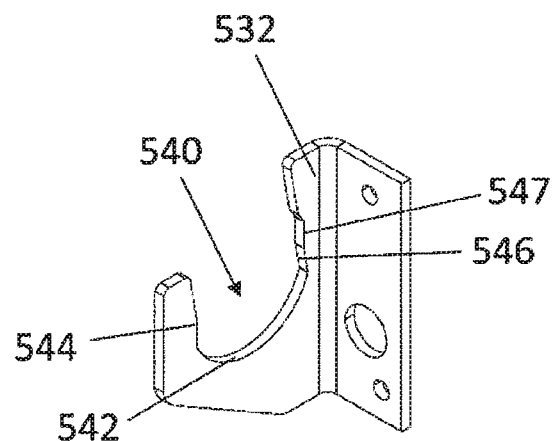
FIG. 29 is a perspective view of a connection piece for the heat exchanger assembly of FIG. 27.
Figure 30:
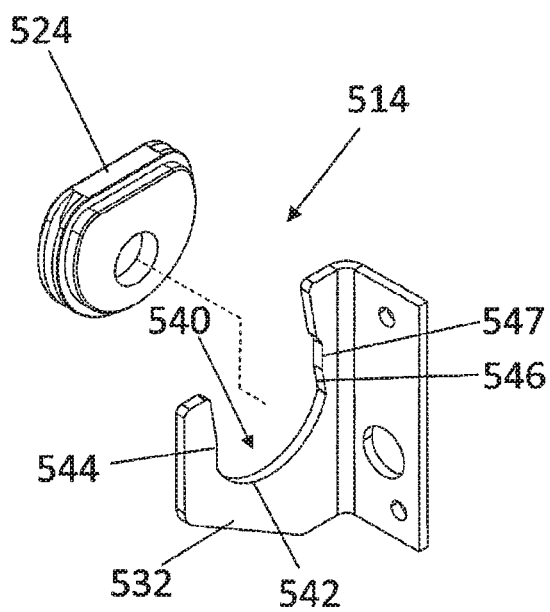
FIG. 30 is an exploded view of the heat exchanger assembly of FIG. 27.
Figure 31:
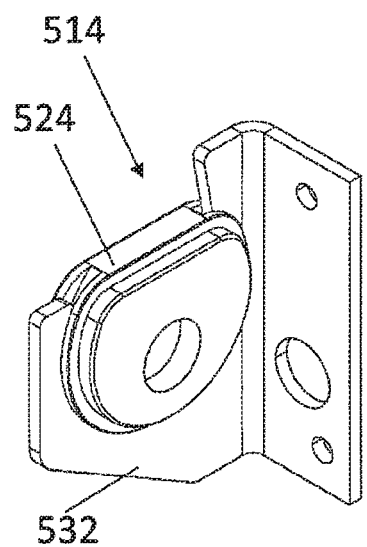
FIG. 31 is an assembled perspective view of the heat exchanger assembly of FIG. 30.

Referring now to FIGS. 25 and 26, the mounting assembly 414 includes a connection piece or plate 432.

Figure 18:
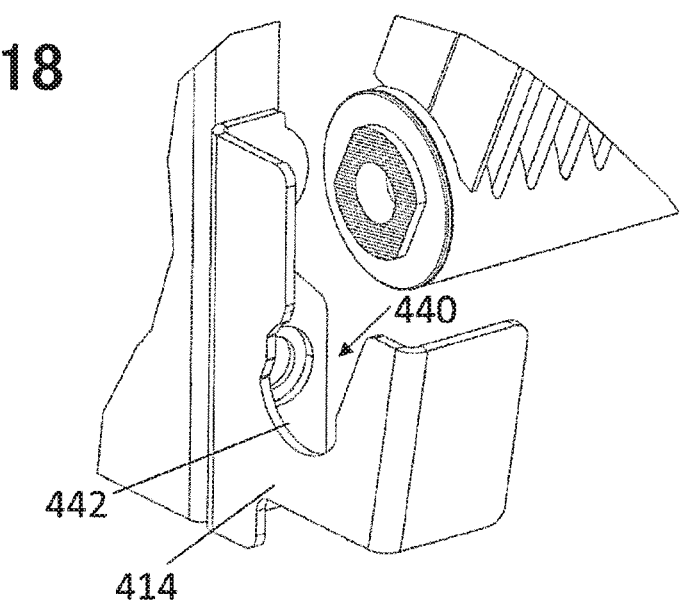
FIG. 18 is a partial perspective view of the heat exchanger assembly of FIG. 17.
Figure 19:
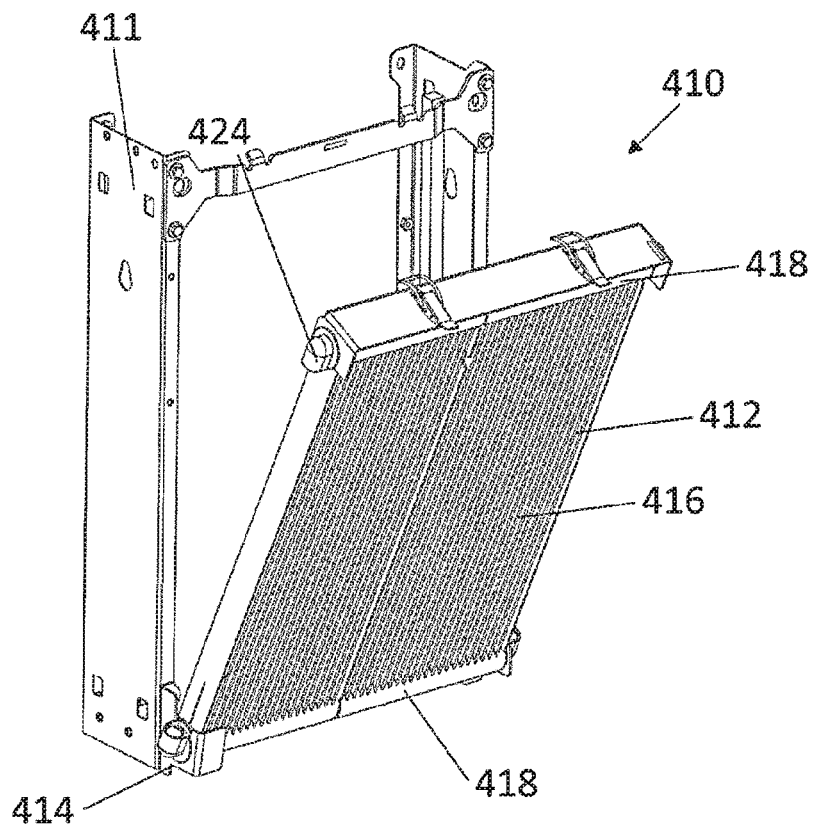
FIG. 19 is an alternative view of the heat exchanger assembly of FIG. 17.
Figure 20:
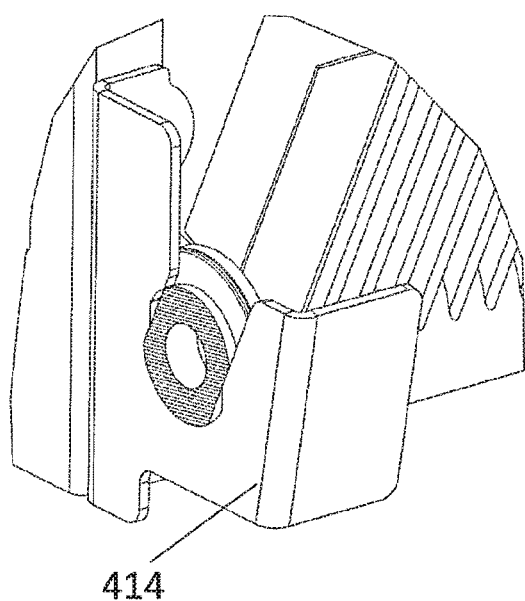
FIG. 20 is a partial perspective view of the heat exchanger assembly of FIG. 17.
Figure 21:
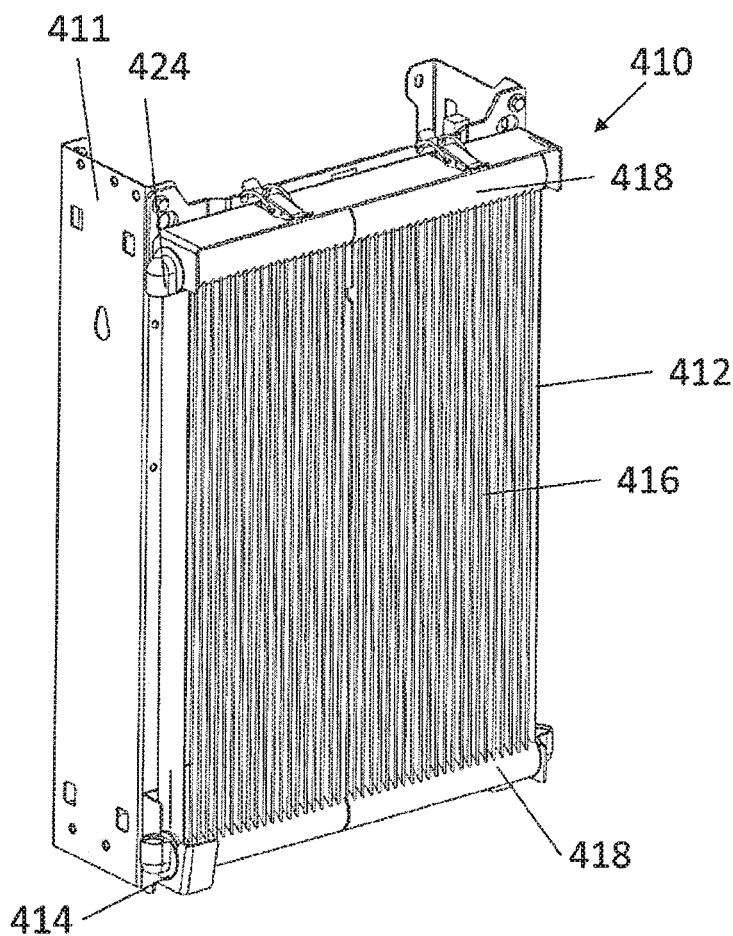
FIG. 21 is a further alternative view of the heat exchanger assembly of FIG. 17.
Figure 22:
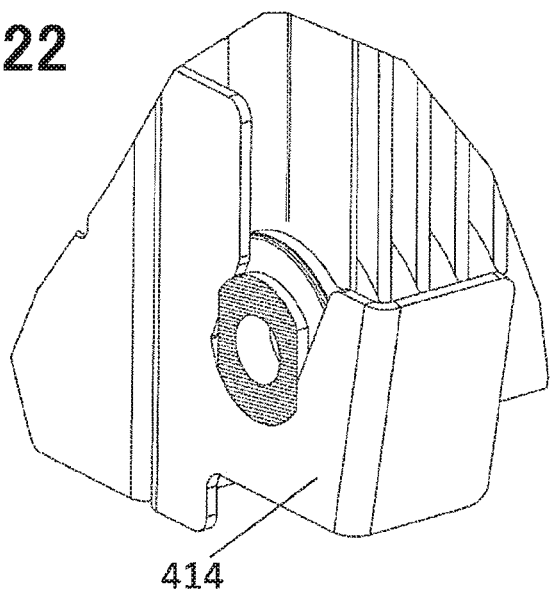
FIG. 22 is a further partial perspective view of the heat exchanger assembly of FIG. 17.

The connection piece or plate 432 is arranged to lie behind the undercut 430 of the end cap 424 as shown in FIGS. 18, 20 and 22. In particular, the connection piece or plate 432 includes an open slot 440 that has an inner edge 442. The inner edge 442 is generally arcuate with parallel straight portions 444, 446 adjacent to the opening. The inner edge 442 of the open slot 440 is asymmetrical and includes a notch or stop feature 447 defined between two straight parts 448, 450. On the opposite side of the slot 440 from the stop feature 447 is another straight part 452, which is parallel to straight part 448.

The connection piece or plate 432 is arranged to be attached to a component of a vehicle, in this example a frame 411.

To mount the heat exchanger 412 on the frame 411, the connection piece or plate 432 is aligned with the end cap 424 such that the open slot 440 is aligned with the undercut 430 and the inner edge 442 of the open slot 440 abuts an outer wall of the end cap 424 in the region of the undercut 430.

The arrangement of the flats 427 of the end cap 424 and the inner edge 442 of the open slot 440 allows the heat exchanger 412 to be pivotably mounted in the frame 411. The flats 427 are aligned with the straight parts 444, 446 at the mouth of the slot 440, so that the heat exchanger end caps can be slid into the slot 440. Once inside the slot, the heat exchanger can be pivoted so that the flats 427 of the end cap 424 engage the straight parts 448, 452. The notch feature 447 limits the pivoting movement of the heat exchanger 412 within the frame. Once pivoted into position, the heat exchanger is attached to the frame 411 at the other end to secure it in position using fasteners, for example catches or latches 415.

It can clearly be seen that the heat exchanger assembly 410 of this embodiment of this present disclosure simplifies the installation of a heat exchanger 412 on a component of a vehicle and requires fewer components. The shapes of the end cap groove 430 and slot 440 ensure that the heat exchanger 412 and frame 411 are locked together.

With reference to FIGS. 27 to 31, there is shown a heat exchanger assembly 510 according to a fifth embodiment of the present disclosure. The heat exchanger assembly 510 includes a heat exchanger 512 and a heat exchanger mounting assembly 514.

The heat exchanger 512 includes a core 516 with a header or manifold tank 518 at each of the top and bottom edge of the core 516. Each header or manifold tank 518 includes an opening (not shown) in the form of an inlet or outlet at each of its ends. Each of the openings (not shown) is covered by an end cap 524.

The end caps 524 are generally cylindrical with a 'D'-shaped cross section and have a port 526 at one end and a portion 528 at an opposite end, the portion 528 being configured for engagement with the opening (not shown) of the header or manifold tank 518. The end cap 524 includes an undercut or recess 530 in the form of a circumferential groove between the port 526 and the portion 528. The undercut or recess 530 includes a pair of flat or straight or planar portions 526, each of which is located on an opposite side of the undercut 530.

The mounting assembly 514 includes a connection piece or plate or mounting bracket 532.

The connection piece or plate 532 is arranged to lie behind the undercut 530 of the end cap 524. In particular, the connection piece or plate 532 includes an open slot 540 that has an inner edge 542. The inner edge 542 is generally arcuate with straight portions 544, 546 adjacent to the opening. The inner edge 542 of the open slot 540 is asymmetrical and includes a notch or stop feature 547.

The connection piece or plate 532 is arranged to be attached to a component of a vehicle.

To mount the heat exchanger 412 on the component of a vehicle, the connection piece or plate 532 is aligned with the end cap 524 such that the open slot 540 is aligned with the undercut 530 and the inner edge 542 of the open slot 540 abuts an outer wall of the end cap 524 in the region of the undercut 530.

The notch feature 547 limits the movement of the heat exchanger 512 relative to the connection piece 532.

It can clearly be seen that the heat exchanger assembly 510 of this embodiment of this present disclosure simplifies the installation of a heat exchanger 512 on a component of a vehicle and requires fewer components.

With reference now to FIG. 32 there is a vehicle 600 having a cab 602 and ground-engaging motive means in the form of front wheels 604 and rear wheels 606. The vehicle 600 may include a heat exchanger assembly 110, 210, 310, 410, 510 as described in relation to any of the embodiments of the present disclosure.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat exchanger assembly comprising:
   a heat exchanger; and
   a connection piece for attachment to a component of a vehicle to mount the heat exchanger; wherein
   the heat exchanger includes a tank,
   an undercut is provided in at least one end cap of the tank, the at least one end cap having a port at one end and a portion for engagement with an opening of the tank at the opposite end,
   the connection piece includes an open slot that defines an edge region that is received within and is to engage with the undercut, and
   the connection piece defines a hole on each side of the open slot to receive a fastener to be fastened to a component of a vehicle.

2. The heat exchanger assembly as defined by claim 1, wherein the heat exchanger assembly includes a single connection piece.

3. The heat exchanger assembly as defined by claim 1, wherein the connection piece is a plate.

4. The heat exchanger assembly as defined by claim 1, wherein the open slot is arcuate.

5. The heat exchanger assembly as defined by claim 1, wherein the open slot includes a straight portion.

6. The heat exchanger assembly as defined by claim 1, wherein the open slot is asymmetrical.

7. The heat exchanger assembly as defined by claim 1, wherein the entrance to the open slot is narrower than the main part of the slot.

8. The heat exchanger assembly as claimed in claim 1, wherein the undercut defines at least one area of reduced width.

9. The heat exchanger assembly as defined by claim 1, wherein the undercut includes at least one straight portion.

10. The heat exchanger assembly as defined by claim 1, wherein the undercut includes two straight portions.

11. The heat exchanger assembly as defined by claim 8, wherein the undercut and open slot are such that the heat exchanger can be offered up to the connection piece in one orientation and then rotated into a different orientation in which the heat exchanger cannot be removed from the connection piece.

12. The heat exchanger assembly as defined by claim 11, wherein
   the undercut has two opposed flats, and
   the open slot has two parallel first surfaces on different sides of the slot and two parallel second surfaces on different sides of the slot, the first and second surfaces being tilted with respect to each other.

13. The heat exchanger assembly as defined by claim 1, wherein the heat exchanger includes a header having a tubular manifold with the at least one end cap at each end.

14. The heat exchanger assembly as defined by claim 13, wherein the undercut includes a circumferential groove that extends around the at least one end cap.

15. The heat exchanger assembly as defined by claim 1, wherein the assembly includes a flange that is arranged for connection to a second heat exchanger.

16. The heat exchanger assembly as defined by claim 1, wherein the assembly includes a frame to which the heat exchanger is mounted, in use.

17. A vehicle including a heat exchanger assembly as defined by claim 1, wherein the assembly includes two connection pieces and two end caps having an undercut, a first connecting piece being received within the undercut of the first end cap and a second connecting piece being received within the undercut of the second end cap.

18. A kit of parts for mounting the heat exchanger assembly on a vehicle, according to the heat exchanger assembly of claim 1, the kit of parts comprising:
- the heat exchanger; and
- the connection piece for attachment to the vehicle; wherein
- the heat exchanger includes an undercut and
- the connection piece is arranged to lie within the undercut.

* * * * *